United States Patent
Swaggerty

[19]

[11] Patent Number: 6,024,521
[45] Date of Patent: Feb. 15, 2000

[54] ELECTRODE DRESSER MONITORING SYSTEM AND METHOD

[75] Inventor: Gregory Swaggerty, Knoxville, Tenn.

[73] Assignee: CSI Technology, Inc, Wilmington, Del.

[21] Appl. No.: 08/956,371

[22] Filed: Oct. 23, 1997

[51] Int. Cl.$^7$ .................................................. B23C 3/00
[52] U.S. Cl. ........................... 409/131; 409/140; 409/148
[58] Field of Search .................................... 409/131, 134, 409/140, 147, 148; 408/6, 1 R, 8, 9, 10, 11

[56] References Cited

U.S. PATENT DOCUMENTS

| | | | |
|---|---|---|---|
| 3,545,310 | 12/1970 | Porath et al. | 408/11 |
| 3,720,135 | 3/1973 | Merner et al. | 408/6 |
| 4,559,577 | 12/1985 | Shoji et al. | 408/6 |
| 4,578,005 | 3/1986 | Fuse et al. | 409/140 |
| 4,604,006 | 8/1986 | Shoji et al. | 408/6 |
| 4,668,136 | 5/1987 | Santa | 409/181 |
| 4,727,775 | 3/1988 | Nishiwaki | 76/1 |
| 4,892,448 | 1/1990 | Hoch et al. | 409/181 |
| 4,921,377 | 5/1990 | Hoch et al. | 409/140 |
| 4,966,506 | 10/1990 | Slanker | 409/140 |
| 5,332,342 | 7/1994 | Kizaki et al. | 409/140 |
| 5,333,975 | 8/1994 | Nishiwaki | 409/132 |
| 5,401,127 | 3/1995 | Nakajima et al. | 409/131 |
| 5,445,481 | 8/1995 | Nakajima et al. | 409/140 |
| 5,545,872 | 8/1996 | Nakajima et al. | 219/89 |
| 5,637,241 | 6/1997 | Moates | 219/109 |

*Primary Examiner*—Daniel W. Howell
*Attorney, Agent, or Firm*—Luedeka, Neely & Graham, P.C.

[57] ABSTRACT

A system and method for monitoring the operating condition of an electrode dresser for an automated spot welder includes a sensor for sensing an operating characteristic of the dresser. The output produced by the sensor is analyzed by a data acquisition system to determine the operating condition of the dresser. Various types of sensors may be employed including a current sensor which senses current flowing through the dresser motor, a flux sensor which senses leakage flux produced by the dresser motor, and a vibration sensor which senses vibration produced during operation of the dresser. Operating characteristics determined by the data acquisition system include whether the electrode dresser is operational, whether the dresser has been engaged by the electrodes of the welder, the amount of time that the welder electrodes were in dress, and the quality of the dress. The data acquisition system may also be configured to perform spectral analysis of sensor data to determine the presence of anomalous dresser operating conditions.

23 Claims, 10 Drawing Sheets

ELECTRODE DRESSER MONITORING SYSTEM AND METHOD

TECHNICAL FIELD

In general, the present invention relates to automated spot welding machines. More particularly, the present invention relates to a method and apparatus for monitoring the operating condition of an automatic electrode dresser for a robotic spot welder.

BACKGROUND

Automatic electrode dressers are used in the robotic spot welder industry to cut or shape the tips of a welding robot's electrodes and rid the electrodes of any contaminates that may have built up on the ends during the welding process. Automatic electrode dressers have recently been used in the robotic industry to replace manual electrode dressers, thereby alleviating the need for hand-held dressing tools or in the alternative, substituting for operations that did not dress the electrodes. Typically, no monitoring of the various conditions of electrode dressers are conducted such as whether the electrode dresser has been engaged by the electrodes or whether a proper tip dress was performed. Moreover, in current practice there is no known monitoring of the electrode dresser to ensure adherence to standards put in place for automatic electrode dressing such as time of electrodes in dress, electrode pressure, electrode alignment during dress, and the like.

SUMMARY OF THE INVENTION

The present invention eliminates the above oversights, difficulties, and disadvantages by providing an apparatus for monitoring the operating condition of an electrode dresser for a welder with electrodes. Included in the present invention is a sensor for sensing an operating characteristic of the electrode dresser. The sensor produces a sensor output which corresponds to the characteristic that was sensed. A data acquisition system receives and analyzes the sensor output to determine the operating condition of the electrode dresser.

Various types of sensors may be employed in accordance with the invention. For example, in one embodiment a current sensor is employed to sense the loading of the dresser motor based on the amount of current flowing through the motor. In another embodiment, a vibration transducer is employed to sense vibration produced during dresser operation. Another sensor that may employed in accordance with the invention is a flux sensor for sensing leakage flux produced by the dresser motor during operation.

The data acquisition system is programmed to analyze sensor data to determine various operating conditions of the dresser. For example, sensor signals are analyzed by the data acquisition system to determine whether the electrode dresser has been engaged by the welder. The data acquisition system can also determine, based on analysis of the sensor signals, the amount of time in which the welder engages the dresser. In accordance with one embodiment of the invention, the time in which the electrodes are in dress is determined by monitoring the sensor signals to determine when the load of the dresser motor increases by a first threshold amount, such as 50 percent. The first threshold amount is an amount of motor load increase that is characteristic of the dresser being engaged by the welder. The data acquisition system records the time at which the first threshold is met as a first time. When the welder disengages from the dresser, motor loading will decrease by a second threshold amount which is characteristic of the event and the data acquisition records a second time. The time differential between the first and second times is the amount of time in which the welder electrodes were in dress.

The apparatus may further include a peak hold circuit which receives the sensor signals and holds a peak amplitude of the sensor signals. The data acquisition system reads and analyzes the peak amplitudes held by the peak hold circuit to determine the operating condition of the dresser. A reset circuit is controlled by the data acquisition system to reset the peak hold circuit after a peak amplitude has been read.

The data acquisition system may be further operable to perform spectral analysis of sensor signals to determine the operating condition of the dresser. For example, vibration signals produced by a vibration transducer may be transformed to the frequency domain to produce a dresser spectrum. Peak amplitudes of the dresser spectrum are compared by the data acquisition system to peak amplitudes of a normal spectrum representing a dresser spectrum that is obtained from a dresser with no operational anomalies. An anomalous dresser operating condition is determined to exist when one or more peak amplitudes differ by a threshold amount.

In accordance with another aspect of the invention, a system is provided for monitoring the operating condition of a plurality of electrode dressers for a plurality of welders with electrodes. The system includes a plurality of sensor where each sensor senses an operating characteristic of a dresser. A plurality of peak hold circuits in electrical communication with the sensors hold peak amplitudes of the sensor outputs. A plurality of vibration transducers sense vibration generated by the dressers. Reset circuits are employed to reset the peak hold circuits after peak amplitudes have been read. A multiplexor is in electrical communication with the peak hold circuits, vibration transducers, and reset circuits. A data acquisition system is also in electrical communication with the multiplexor to receive peak amplitudes and vibration signals from the multiplexor and to reset the peak hold circuits after peak amplitudes are read. The data acquisition system analyzes the peak amplitudes and vibration signals to determine the operating conditions of the welders.

The present invention also provides a method for monitoring the operating condition of a welder electrode dresser. The method includes the steps of sensing an operating characteristic of the electrode dresser to produce a sensor output corresponding to the operating characteristic that is sensed, and analyzing the sensor output to determine the operating condition of the dresser.

BRIEF DESCRIPTION OF THE DRAWINGS

Preferred embodiments of the invention will now be described in further detail. Other features, aspects, and advantages of the present invention will become understood with regard to the following description, appended claims, and accompanying drawings where:

DESCRIPTION OF THE PREFERRED EMBODIMENT(S)

Figure 1:
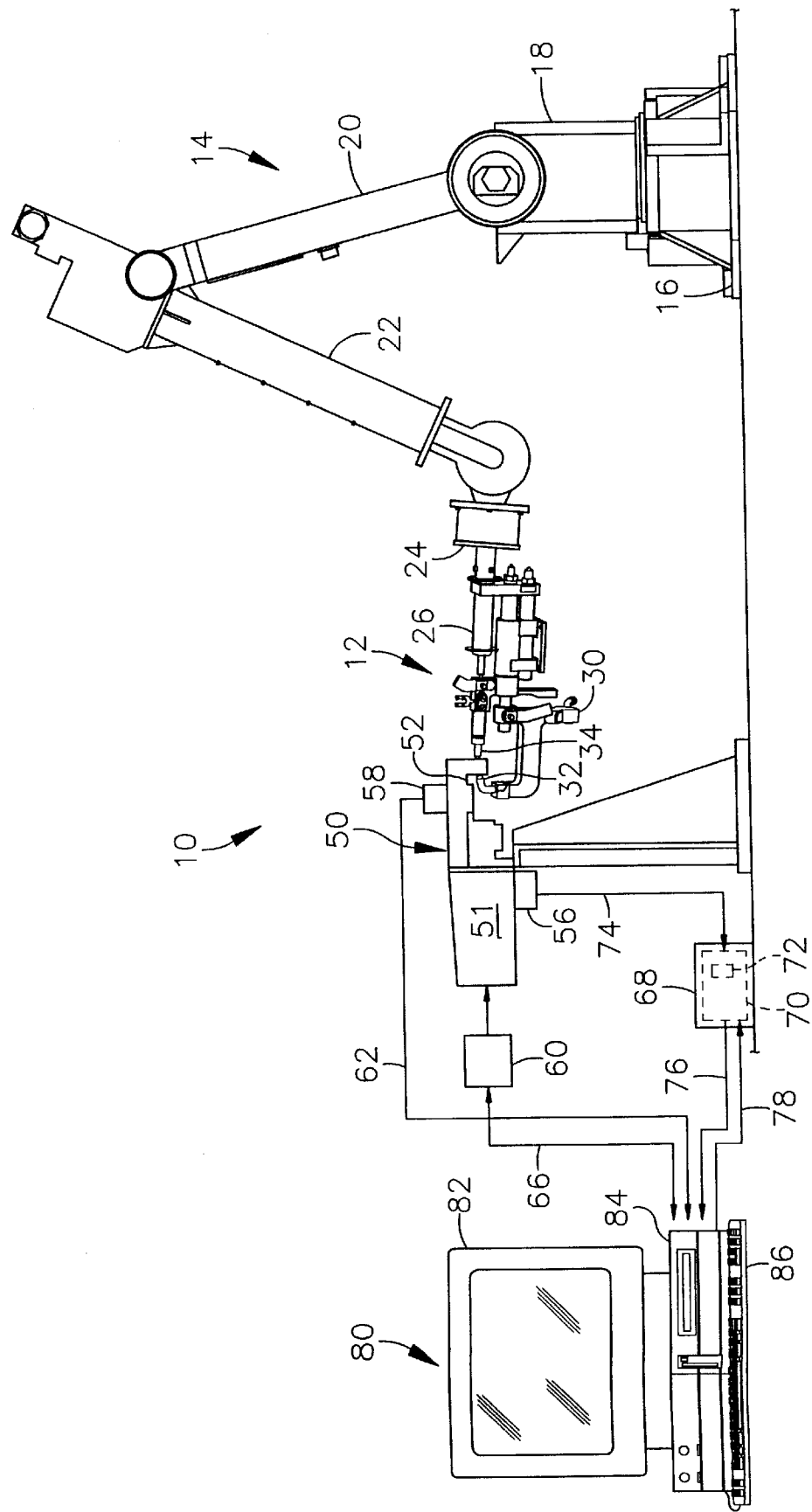
FIG. 1 is a perspective view of a robotic welder with an electrode dresser and electrode dresser monitor in accordance with the present invention.

Commencing with FIG. 1, a system 10 for monitoring electrodes 12 of a robotic welder 14 is shown. The welder 14 is preferably a resistance welder and includes a base 16 on which is swivelably mounted member 18. Hingedly attached to member 18 is an extension member 20 that is attached to boom arm 22. Rotatably coupled to the boom arm 22 is a breakaway device 24, which is attached to a gun mounting bracket 26. Secured to the mounting bracket 26 is a welding gun 30 that includes a first electrode 32 and a second electrode 34. In operation of the robotic welder 14, sheets of conductive material which are to be welded are typically placed between the first and second electrodes 32, 34 and a flow of current is transferred between the electrodes whereby an electrically conductive path is created by the contact of the electrodes 32, 34 with the pieces of conductive material.

Also shown in FIG. 1 is an electrode dresser 50 that the robotic welder 14 engages periodically for dressing the electrodes 32, 34. The dresser 50 is typically engaged every 150 to 400 welds, which for a typical automotive metal fabrication process, for example, would result in the electrodes 32, 34 being dressed approximately every 10 to 15 minutes. In a preferred embodiment, the robotic welder 14 engages the dresser 50 for approximately 0.5 to 1.0 seconds and then resumes welding.

The electrode dresser 50 typically includes a two-horsepower AC induction motor 51 with an associated power source that drives a geared drive mounted in an extension 52. The drive preferably contains a three or four blade cutter with cutting teeth. During the dressing process, electrodes 32, 34 are brought into contact with the rotating cutting teeth of the dresser 50. The cutting action of the teeth shapes the tips of electrodes 32, 34 which might otherwise degrade the quality of welds produced by the welder 14. The electrode dressing action of the cutting teeth also characteristically increases the loading of the dresser motor 51, which in turn increases the amount of electrical current that the motor 51 draws. As the teeth engage the electrodes 32, 34, characteristic vibrations are also produced. It has been determined that by monitoring one or more operating characteristics of the electrode dresser 50, such as the load and flux of the dresser motor 51 and vibration produced by the dresser 50 including vibration produced when the electrodes 32, 34 engage the cutting teeth, one can determine substantial information relating to the operating condition of the dresser 50, including when the electrodes 32, 34 are being dressed by the dresser 50.

Figure 2:
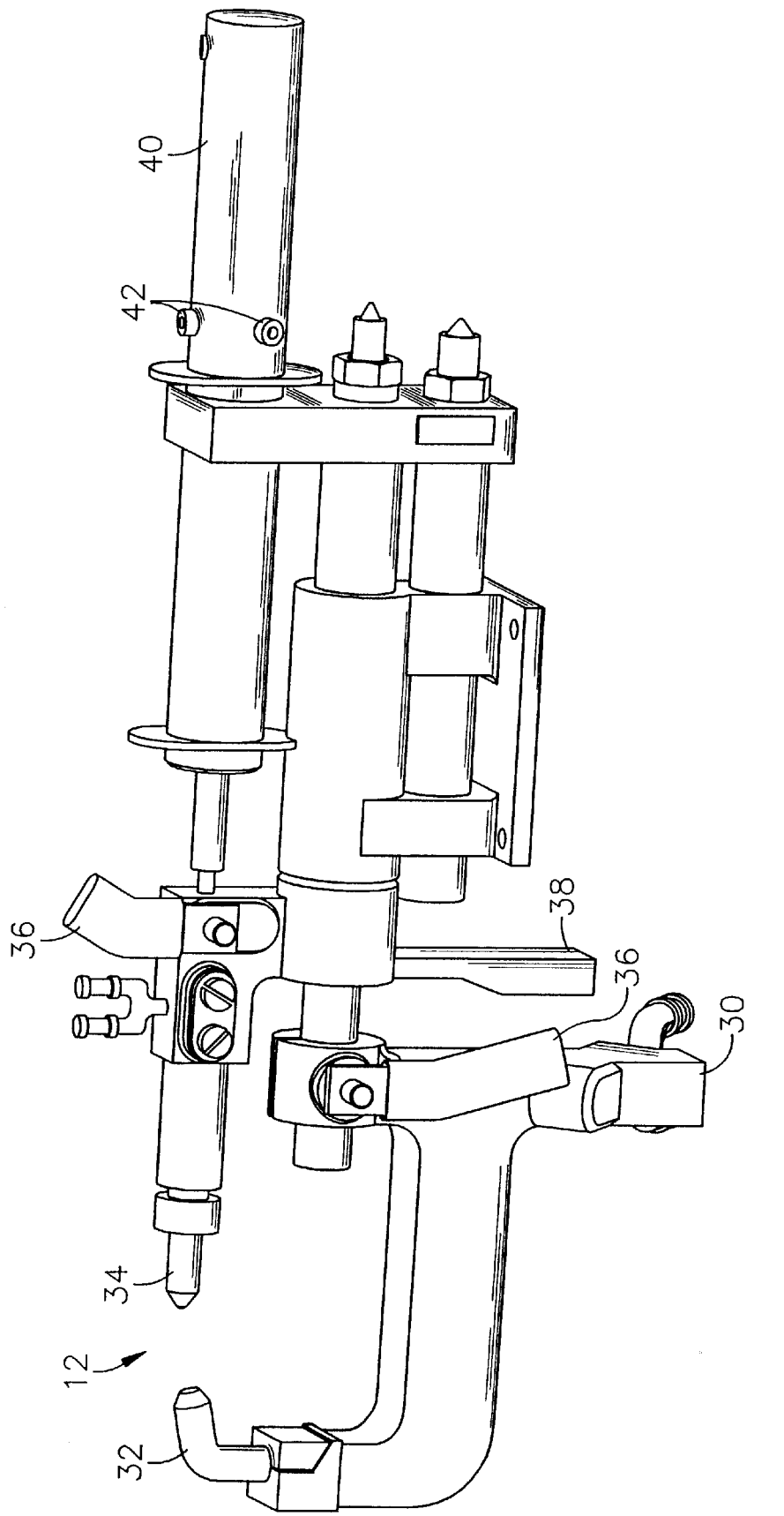
FIG. 2 is a perspective view of the electrodes of the robotic welder of FIG. 1.

As best shown in FIG. 2, the welding gun 30 includes a weld cable 36 attached thereon as well as a mounting face 38. The welding gun 30 also includes a cylinder 40 with cylinder ports 42. Appropriate connections are made to the cylinder ports 42 to introduce air or liquid for cooling of the electrodes 32, 34.

Referring again to FIG. 1, the system 10 further includes a sensor 56 for determining the operating status of the system 10. Although a variety of sensor types may be employed to determine the operating condition of the dresser 50, including a flux sensor which senses axial leakage flux generated by the dresser motor 51, in a preferred embodiment of the invention sensor 56 is a current load sensor 56 in electrical communication with the power source or other current conducting element of the dresser motor 51. The current load sensor 56 senses the amount of electrical current being draw by the dresser motor 51 and outputs a signal in the form of a voltage on line 74 corresponding to the level of current sensed. Although the raw voltage signal on line 74 can be received and processed directly by the data acquisition and processing system 80, in a preferred embodiment the voltage signal on line 74 is first received by a peak hold circuit 70 which samples the voltage signal 74 and holds the peak amplitude of the voltage signal until the peak hold circuit 70 is reset by a reset circuit 72. The peak amplitude held by peak hold circuit 70, which corresponds to the peak load of the dresser motor 51 occurring since the last reset, is read by the data acquisition and processing system 80. After the peak held amplitude is read, the data acquisition system 80 outputs a signal to the reset circuit 72 which resets the peak hold circuit 70 for the next sample time period. Thus, the peak hold circuit 70 pre-processes the sensor output on line 74 so that the data acquisition system 80 need not continuously monitor the sensor output 74. The peak hold circuit 70 and reset circuit 72 are preferably enclosed in a breakout box 68 for enhanced protection in industrial settings.

In a preferred embodiment, the data acquisition system 80 is a personal computer programmed to process the peak amplitude values of the peak hold circuit 70 to determine the operating condition of the electrode dresser 50. The data acquisition system 80 includes a user interface consisting of a monitor 82 and a keyboard 86, and a central processing unit 84 for processing sensor data.

Figure 3:
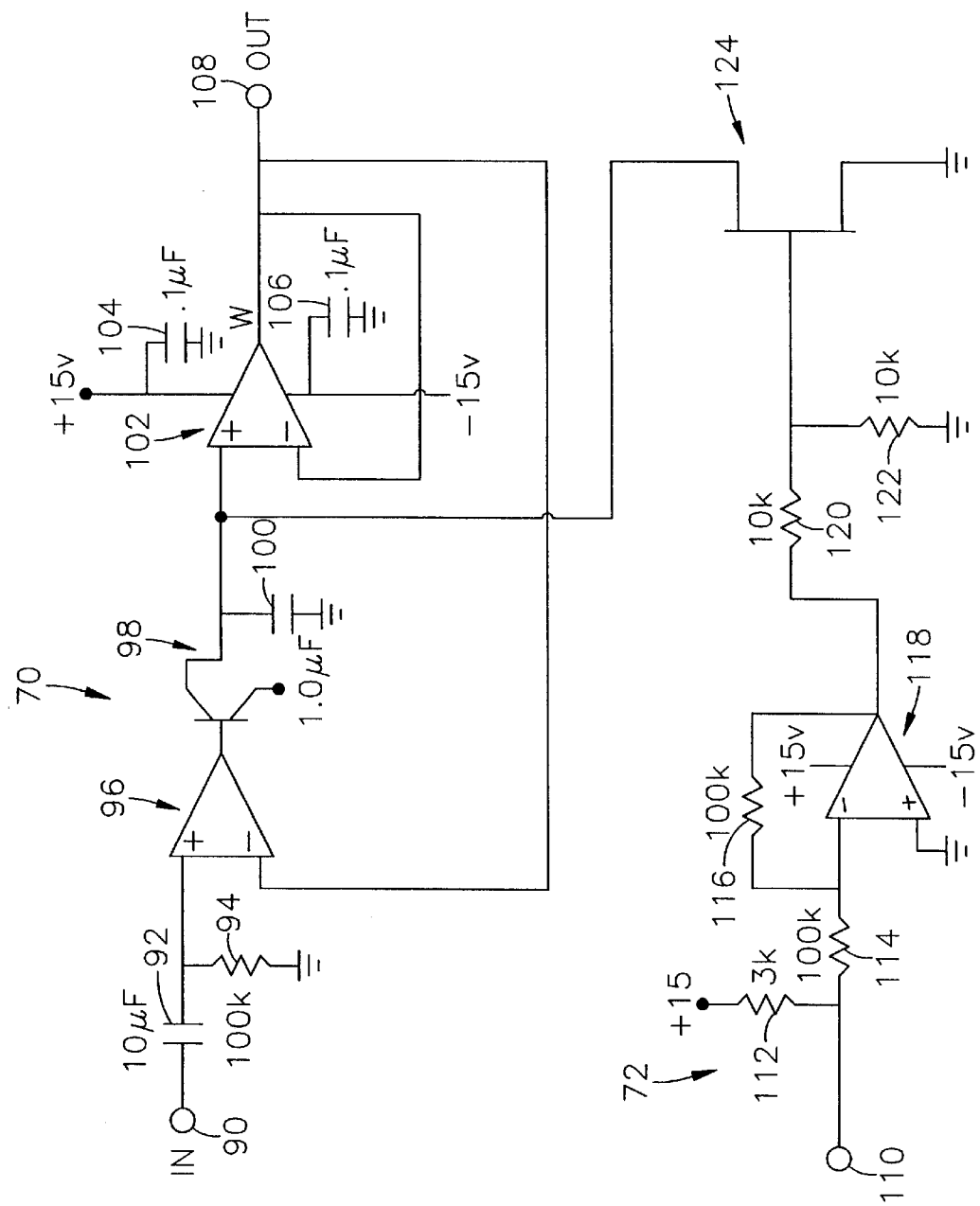
FIG. 3 is a circuit diagram of a peak hold circuit and reset circuit in accordance with the invention.

FIG. 3 is a schematic circuit diagram of a preferred embodiment of the peak hold circuit 70 and reset circuit 72. The peak hold circuit 70 includes a signal-in port 90 in electrical communication with the current load sensor 56. The signal-in port 90 is coupled to a first end of a 10 microfarad capacitor 92. The second end of the capacitor 92 is coupled to a 100K resistor 94 and also to the non-inverting input of an operational amplifier 96. The inverting terminal of operational amplifier 96 is coupled to a signal-out port 108 that is in electrical communication with the data acquisition system 80 via line 76. The output of operational amplifier 96 is connected to the base of a transistor 98 which is preferably of the type N2222. The emitter of transistor 98 is connected to a 15 volt source and the collector is coupled to a 1 microfarad capacitor 100 and to the collector of transistor 124 which is preferably of the type 2N3819. The emitter of transistor 124 is tied to ground. The collector of transistor 98 is also coupled to the non-inverting input of operational amplifier 102. The inverting input of operational amplifier 102 is connected to the signal-out port 108. Operational amplifier 102 is supplied with positive and negative 15 volts. A 0.1 microfarad capacitor 104 is connected to a plus 15 volt power source at a first end and to ground at a second end. Operational amplifier 102 is also powered with a minus 15 volt source of which a 0.1 microfarad capacitor 106 is coupled at a first end and to ground at a second end.

Reset circuit 72 includes a signal-in port 110 which is connected to the data acquisition system 80 at line 78. The signal-in port 110 is coupled to a first end of a 3K resistor 112. A second end of the resistor 112 is connected to a plus 15 volts source. The signal-in port 110 is also connected to a first end of a 100K resistor 114. A second end of resistor 114 is coupled to the inverting input of operational amplifier 118 and also to a first end of a 100K resistor 116. A second end of resistor 116 is coupled to the output of operational amplifier 118. The non-inverting input of operational amplifier 118 is coupled to ground. Operational amplifier 118 is connected to a positive 15 volt source and a negative 15 volt source while the output is connected to a first end of a 10K resistor 120. A second end of resistor 120 is in electrical communication with the emitter of transistor 124 and to a first end of a 10K resistor 122. The second end of resistor 122 is connected to ground.

Figure 5:
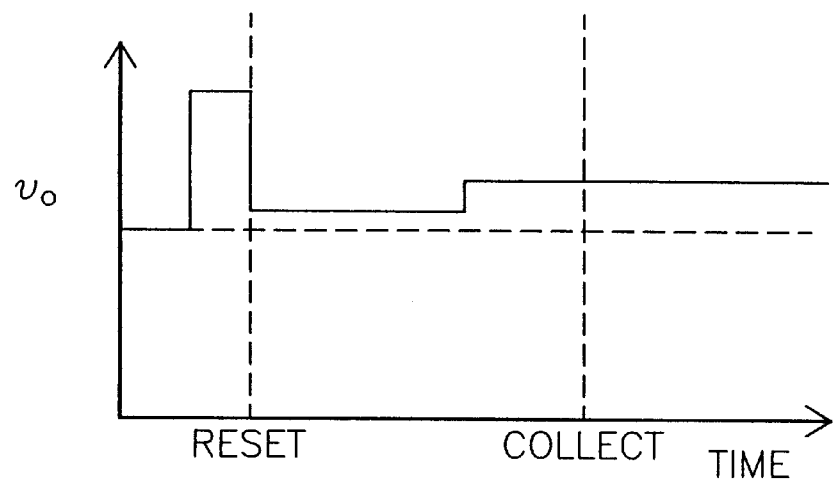
FIG. 5 is a diagram showing exemplary peak motor load values held by the peak hold circuit of FIG. 3.

Shown in FIG. 5 is a timing diagram showing the output voltage of the peak hold circuit 70 upon reset by a signal from the reset circuit 72. Circuit 72 resets the peak hold circuit 70 after the peak amplitude (Vo) stored in circuit 70 has been read by the data acquisition system 80 via line 76. During the time between peak hold circuit reset and read, the data acquisition system 80 can poll peak hold circuits associated with other electrode dressers.

Peak amplitudes read from the peak hold circuit 70 are analyzed by the data acquisition system 80 to determine the operating status of the dresser 50. The peak amplitudes are also stored in memory over time and trended to further determine the operating condition of the dresser 50.

Figure 4:
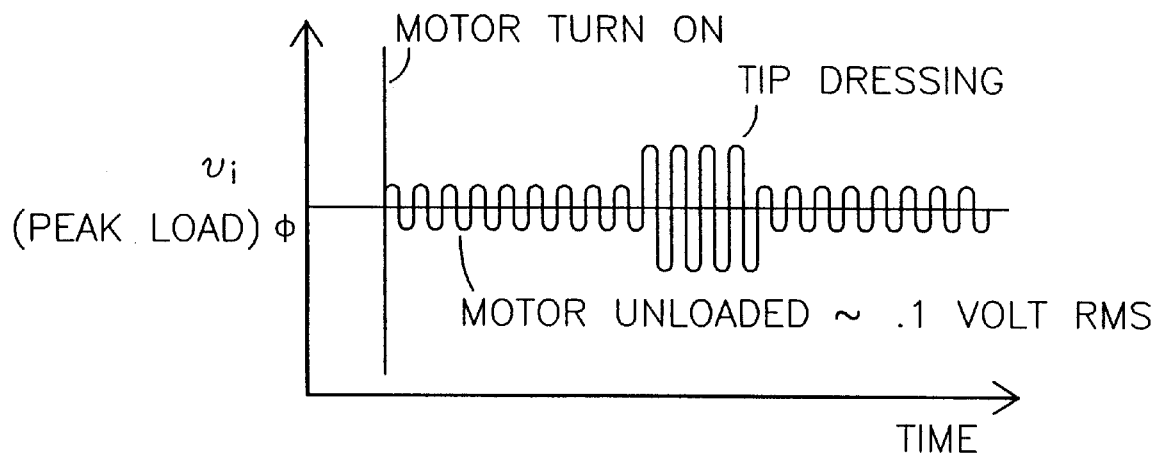
FIG. 4 is a waveform diagram showing typical dresser motor loading.
Figure 6:
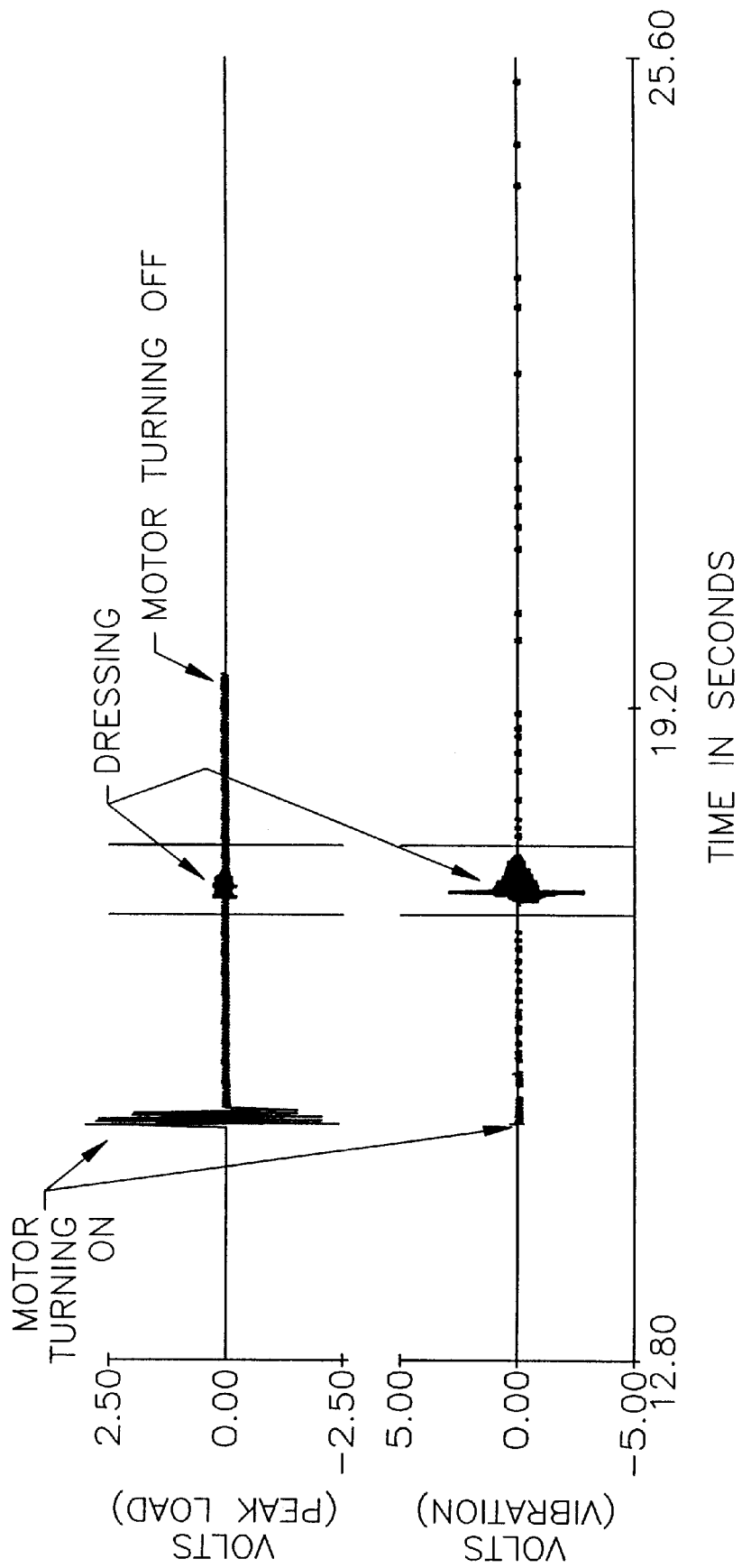
FIG. 6 is a waveform diagram showing typical peak load and vibration signals generated by an electrode dresser and monitor in accordance with the invention.
Figure 7:
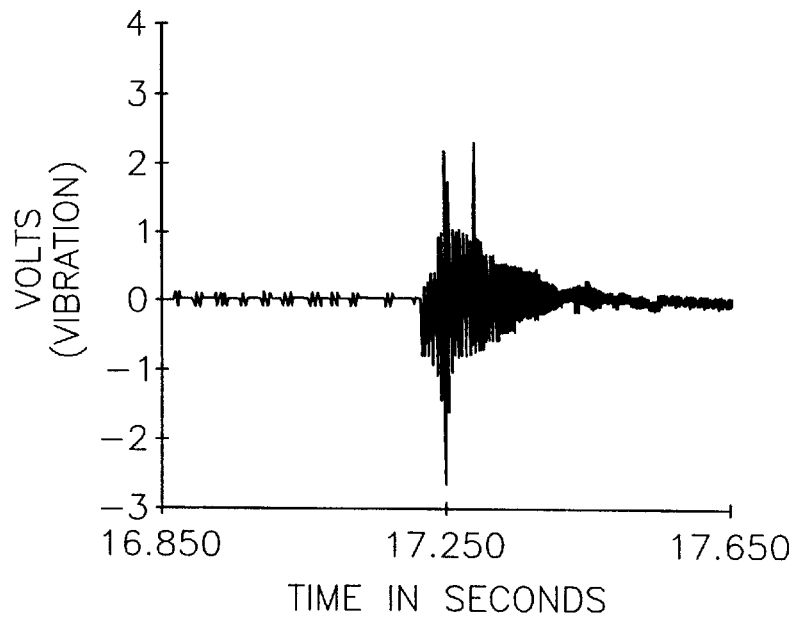
FIG. 7 is a time waveform of a vibration signal produced by electrode dresser and monitor of the present invention.
Figure 8:
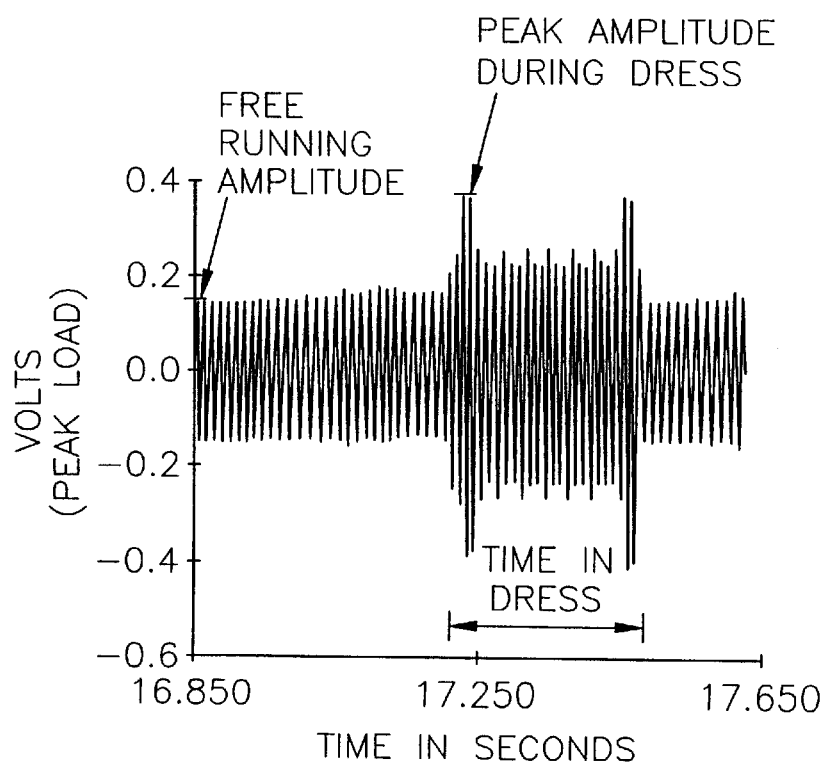
FIG. 8 is a time waveform of a peak load signal produced by an electrode dresser and monitor of the present invention.

One way in which the peak data can be analyzed is to monitor the timing and amplitude of the peaks to ensure that peaks are occurring in a manner characteristic of electrodes 32, 34 engaging the dresser 50. As shown in FIGS. 4, 6, and 8, the dresser motor 51 will draw a minimum amount of power when the dresser 50 is operating but the blades are not engaged and cutting. This condition is typically referred to as "free-running". A free-running condition which occurs when the dresser 50 should be engaged by the electrodes 32, 34 can be the result of any number of anomalies, including misalignment of the electrodes 32, 34 or excessive electrode wear. Or, the robotic welder 14 may simply fail to engage the electrode dresser 50. The data acquisition system 80 is programmed to determine when the peak amplitudes read from the peak hold circuit 70 have increased by a threshold amount. In a preferred embodiment, the threshold is a 50 percent increase in peak amplitude. When the peak amplitude from the peak hold circuit 70 does not increase by at least 50 percent at the appropriate time, the data acquisition system 80 produces an alarm signal and indicates on monitor 82 that the dresser 50 was not engaged at the appropriate time. When the peak amplitude differs by a threshold amount, which amount may vary according to the type of anomaly that is being monitored and the acceptable level of degradation, the data acquisition system 80 records the time at which the dress occurred.

Referring again to FIG. 1, the system 10 may also be configured to provide a qualitative assessment of the electrode dressing process by employing a vibration transducer, such as an accelerometer 58, to sense mechanical vibration generated by the electrode dresser 50. When the electrode dresser 50 performs an improper electrode dress due to such anomalies as improper electrode engagement pressure, improper electrode alignment with the cutting teeth, dull cutting teeth, and the like, the particular anomaly is detected from spectral analysis of vibration signals produced by the accelerometer 58. The accelerometer 58 senses vibration generated by the dresser 50 and produces an output on line 62 corresponding to the sensed vibration. Vibration signals output by the accelerometer 58 are received by the data acquisition system 80 and transformed to the frequency domain (preferably by Fourier transform) to produce a dresser frequency spectrum. The data acquisition system 80 analyzes the spectral data and determines whether an anomalous operating condition exists, such as a failure of the dresser 50 or a failure of the electrodes 32, 34 to properly engage the dresser 50.

Figure 11A:
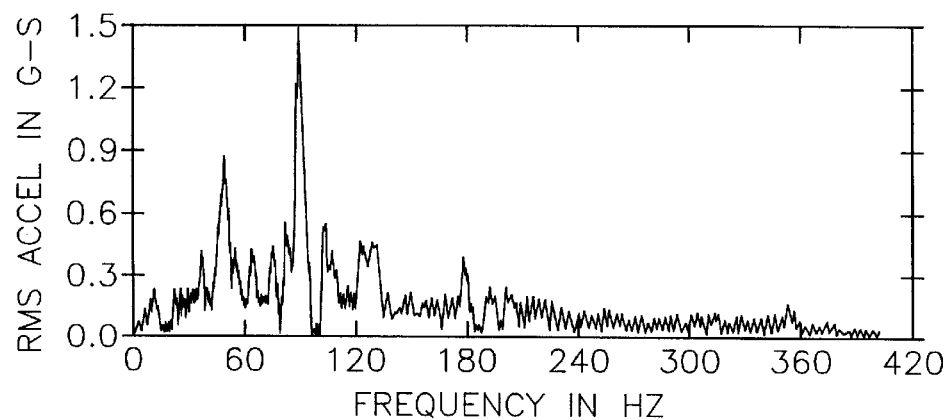
FIG. 11A is a vibration frequency spectrum of an electrode dresser operating under normal fault-free conditions.

In a preferred embodiment, the data acquisition system 80 analyzes the spectral data by comparing normal vibration spectra obtained from a properly functioning electrode dresser to the measured dresser frequency spectra produced from vibration signals generated by the accelerometer 58. An anomalous operating condition is determined to exist when the compared spectra differ by a threshold amount. For example, the vibration spectrum for a typical electrode dresser with no anomalous operating conditions is shown in FIG. 11A. From FIG. 11A, it can be seen that the maximum amplitude is approximately 1.5 RMS acceleration and occurs at a frequency of about 85 HZ. The next highest amplitude of the spectrum is an amplitude of about 0.75 RMS acceleration occurring at a frequency of about 50 HZ. As shown in the corresponding time domain graph of FIG. 11B, the maximum amplitude of a normal electrode dress occurs between about 325 to 600 milliseconds when the electrode dresser 50 is engaged by the electrodes 32, 34.

Figure 11B:
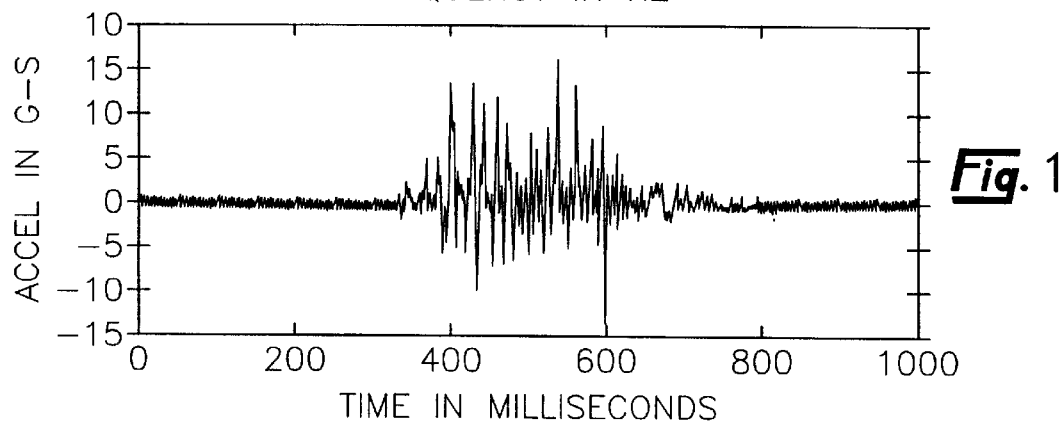
FIG. 11B is a time domain waveform corresponding to the frequency spectrum of FIG. 11A.
Figure 12A:
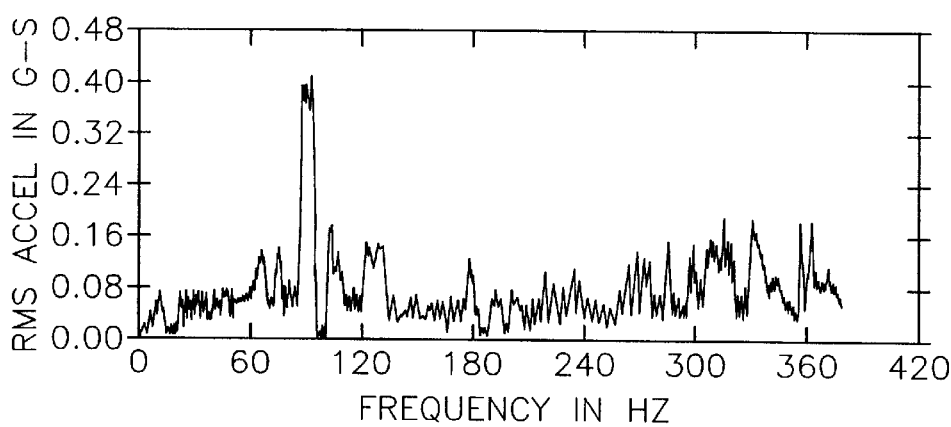
FIG. 12A is a vibration frequency spectrum of an electrode dresser with chattering occurring due to insufficient pressure being applied between the electrodes and dresser teeth.
Figure 12B:
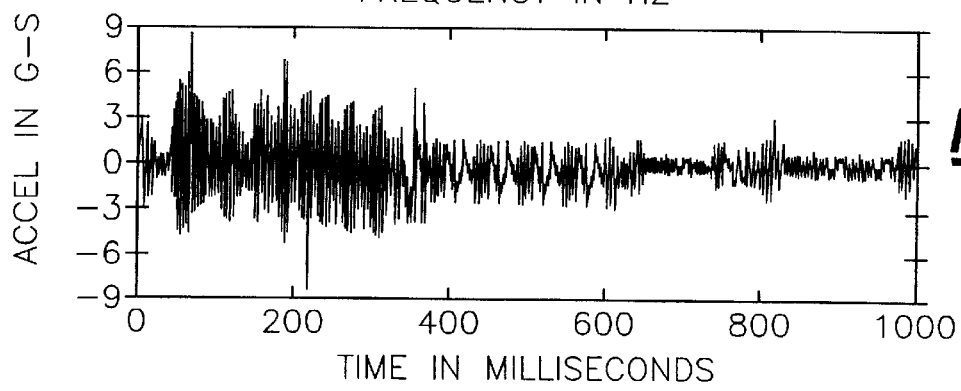
FIG. 12B is a time domain waveform corresponding to the frequency spectrum of FIG. 12A.

FIG. 12A shows a measured frequency spectrum which results when chattering of the electrode dresser teeth occurs due to insufficient pressure being applied between the electrodes 32, 34 and dresser teeth. Under this anomalous operating condition, a maximum amplitude of about 0.4 RMS acceleration occurs at a frequency of about 85 HZ. The time domain vibration waveform corresponding to the vibration spectrum of FIG. 12A is shown in FIG. 12B. It has been determined that the maximum spectral amplitude for this particular anomaly will occur at a frequency approximately equal to the maximum amplitude frequency for a normal electrode dress. As shown in the time domain vibration waveform of FIG. 12B, the maximum amplitude for chattering of the electrode dresser teeth occurs between 50 and 75 milliseconds, which is also uncharacteristic of a normal electrode dress as shown in FIG. 11B. Thus, in order for the data acquisition system 80 to detect the existence of dresser chattering, it need only compare the magnitudes of the maximum amplitudes between the normal electrode dress shown in FIG. 11A and that of FIG. 12A and if those magnitudes differ by a threshold amount (such as 50 percent), then a chattering condition is determined to exist.

Figure 13:
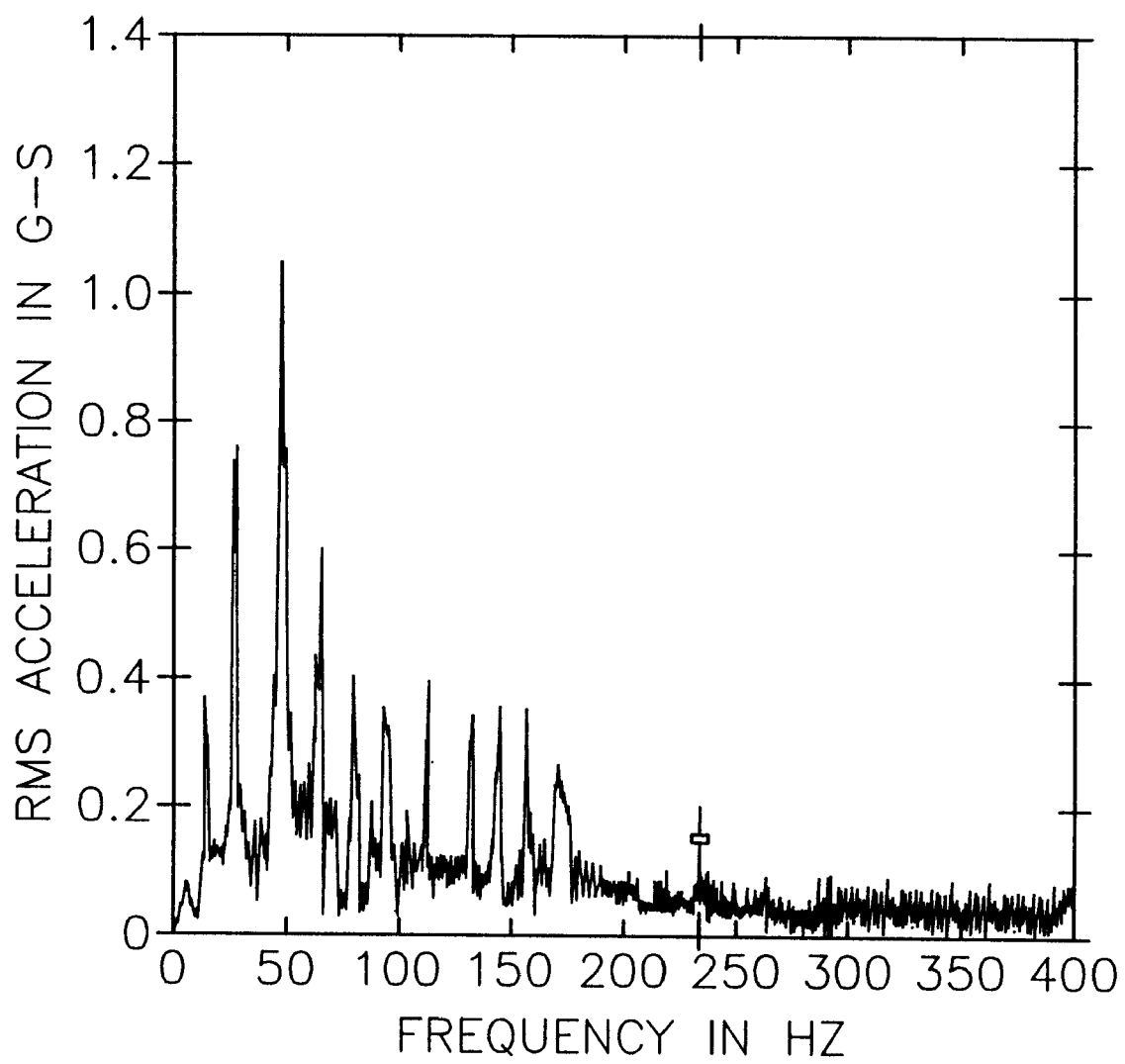
FIG. 13 is a vibration frequency spectrum of an electrode dresser with dull teeth.

The vibration spectrum of an electrode dresser 50 with dull teeth on its cutter blades is shown in FIG. 13. For this anomalous operating condition, the maximum spectral amplitude is about 1.05 RMS acceleration, which is approximately one third less than the maximum amplitude of the normal electrode dress operation shown in FIG. 11A. Further dulling of the teeth will typically produce a further reduction in the maximum amplitude. Moreover, the maximum amplitude of the spectrum shown in FIG. 13 occurs at a frequency of about 47 HZ, which is almost one-half the frequency at which the maximum amplitude is observed for the normal electrode dress of FIG. 11A. Thus, the data acquisition system 80 determines when the dresser teeth have become dull by comparing the maximum amplitude and corresponding frequency of a threshold frequency spectrum. The dresser teeth are determined to be dull when the maximum amplitudes and corresponding frequencies differ by a user-determined threshold amount.

As can be seen from the time domain waveforms shown in FIGS. 4–8, distinct vibration patterns emerge during electrode dresser motor turn on, electrode dressing, and time in dress. As shown in FIG. 6, when the dresser motor 51 turns on, a sharp voltage spike having a magnitude of about 2.5 volts is output by sensor 56, held by the peak hold circuit 70, and read by the data acquisition system 80. From this initial turn on spike, the data acquisition system 80 knows that the dresser 50 is now active. The data acquisition system 80 then waits for a first time when the amplitude of the peak value held by the peak hold circuit 70 increases by a threshold amount, such as 50 percent, indicating that the dresser 50 has been engaged.

For example, when the data acquisition system 80 detects a threshold increase in peak dresser motor loading, it ascertains the first time value and stores the first time value in memory. A second time value is stored in memory when the peak load amplitude once again falls below the 50 percent threshold. The data acquisition system 80 then determines the amount of time in which the electrodes 32, 34 are in dress by determining the difference between the first and second time values.

Figure 9:
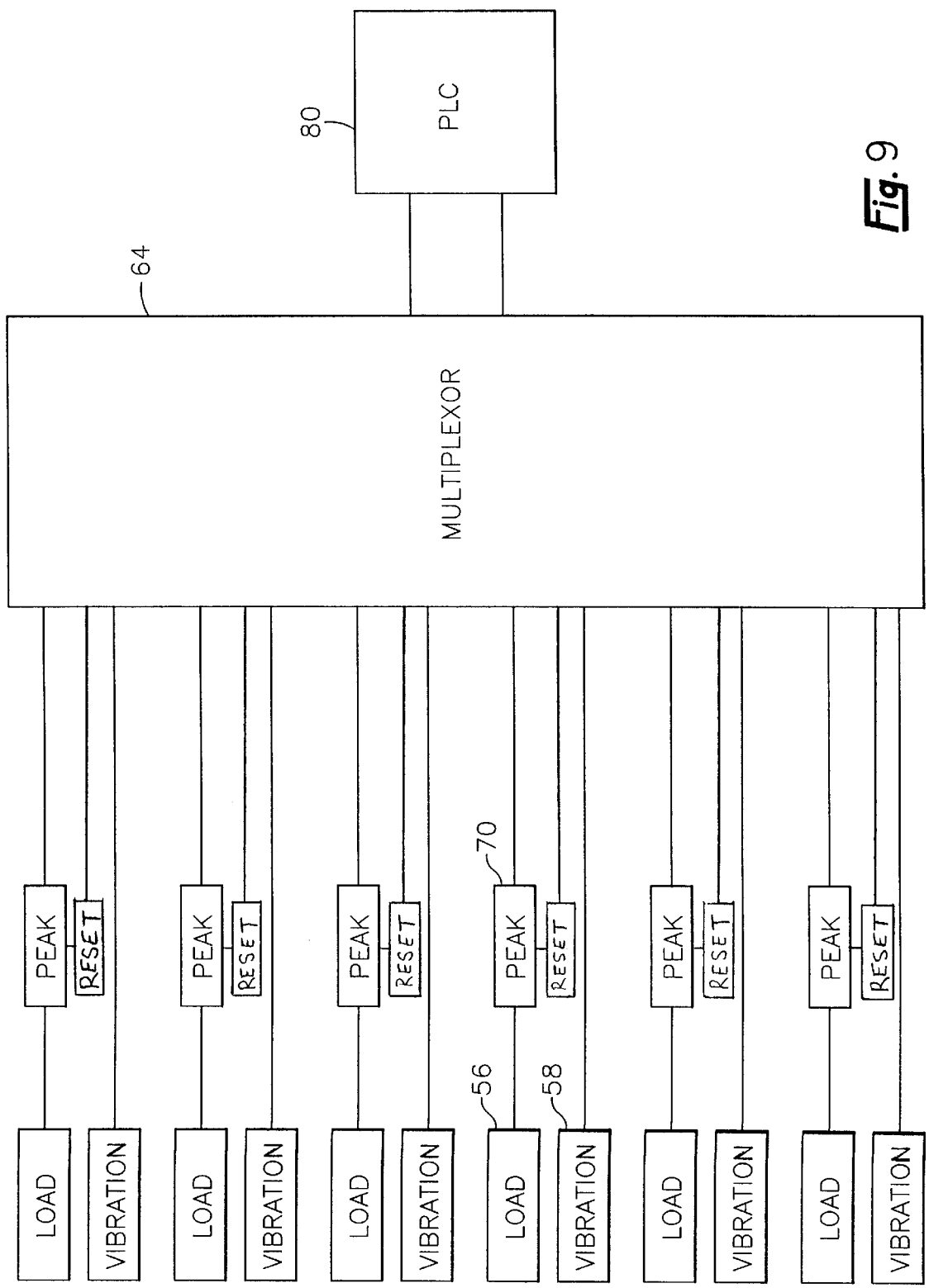
FIG. 9 is a circuit schematic showing six tip dressers multiplexed into a data acquisition system of the present invention.

As shown in FIG. 9, the system 10 may be configured to include a multiplexer 64 for multiplexing a plurality of individual sensors 56 and accelerometers 58 so that a plurality of electrode dressers 50 can be monitored by a single data acquisition system 80. In the present system 10, each "work cell" contains six sets of motor load sensors 56, accelerometers 58, and corresponding peak hold circuits 70 that are in electrical communication with the multiplexer 64. In order to monitor the various electrode dressing operations typically found within the plant environment, the data acquisition system 80 stores all of the peak motor load values in the peak hold circuits 70 until it processes the data, resets the peak hold circuits 70 through the reset circuits 72, and prepares for the collection of additional data. The system 10 also systematically polls each of the electrode dressers 50 to obtain vibration data from the individually associated accelerometers 58. It will be understood, however, that the peak hold circuit 70 would not be as useful in the present system 10 if only one data acquisition system 80 was coupled to only one unique electrode dresser 50. The quantitative sensor measurements are available for every completed electrode dress operation, while the qualitative vibration measurements taken from the accelerometers 58 are preferably sampled in one out of three electrode dresses of each electrode dresser, depending on the number of welders 14 being monitored by the data acquisition system 80, since each data acquisition system 80 is preferably multiplexed to a plurality of accelerometers 58 and peak hold circuits 70.

Referring now to FIGS. 1 and 9, the system 10 may further include a robot data acquisition system 60 that is electrically connected to the electrode dresser 50 for turning the dresser 50 on and off. The robot data acquisition system 60 is also in electrical communication with the data acquisition system 80. The data acquisition system 80 sends process controls to the welder data acquisition system 60 for placing the electrode dresser 50 in an active or inactive state.

Figure 10:
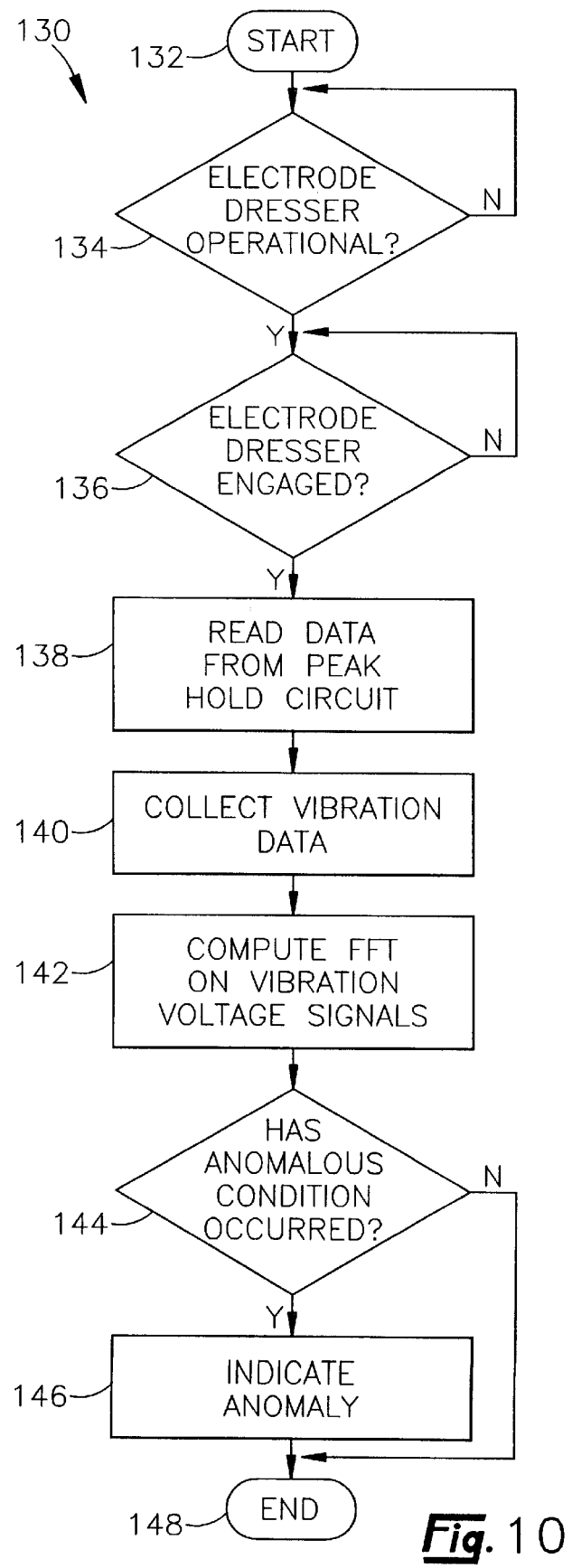
FIG. 10 is a flow chart diagram of a method of the present invention.

FIG. 10 provides a flowchart representation of a method 130 for monitoring an electrode dresser 50 in accordance with the invention. The method 130 begins or starts in bubble 132 and falls to decision block 134 whereby it is determined whether the electrode dresser 50 is operational by determining whether the peak value of circuit 70 is greater or less than zero. If the answer in decision block 134 is no, the method 130 loops back to the start of block 134. If, however, the electrode dresser 50 is determined to be operational in decision block 134 the method 130 falls to decision block 136 whereby it is determined whether the electrode dresser 50 is engaged by the electrodes 32, 34 by measuring the peak value from the peak hold circuit 70 (or directly from sensor 56) and determining whether there has been a threshold peak value increase of at least 50 percent. If the electrode dresser 50 is determined to not be engaged, the method 130 loops back to the top of block 136.

If, however, it is determined in decision block 136 that the electrode dresser 50 is engaged the method 130 falls to task block 138 whereby data is read from the peak hold circuit 70 by the data acquisition system 80. The method 130 next falls to task block 140 whereby vibration data is collected from the accelerometer 58 by the data acquisition system 80. The method 130 then falls to task block 142 whereby a Fast Fourier Transform is computed on the vibration data received from the accelerometer 58 by the data acquisition system 80. The method 130 next falls to decision block 144 whereby it is determined whether an anomalous operating condition has occurred, as previously described. If it is determined in block 144 that an anomaly has not occurred, the method 130 branches to bubble 148 and ends. If, however, in decision block 144 it is determined that a welder anomaly has occurred the method falls to task block 146 whereby an anomaly is indicated to the operator, preferably by visual indication at monitor 82. The method next falls to bubble 148 and stops or ends.

While the invention has been described in detail, it is to be expressly understood that it will be apparent to persons skilled in the relevant art that the invention may be modified without departing from the spirit of the invention. Various changes of form, design or arrangement may be made to the invention without departing from the spirit and scope of the invention. Therefore, the above mentioned description is to be considered exemplary, rather than limiting, and the true scope of the invention is that defined in the following claims.

What is claimed is:

1. An apparatus for monitoring the operating condition of an automatic electrode dresser for a welder with electrodes, the electrode dresser having a motor, the system comprising:

a sensor for sensing an operating characteristic of a welder electrode dresser and producing a sensor output corresponding to the operating characteristic that is sensed; and a data acquisition system for receiving and analyzing said sensor output to determine the operating condition of the electrode dresser.

2. The apparatus of claim 1 wherein said sensor is a current sensor for sensing an electrical current flowing through the dresser motor.

3. The apparatus of claim 1 wherein the data acquisition system is further operable to analyze said sensor output to determine whether the electrode dresser has been engaged by the welder.

4. The apparatus of claim 1 wherein said data acquisition system is further operable to analyze said sensor output to determine the amount of time in which the welder engages the electrode dresser.

5. The apparatus of claim 1 wherein said data acquisition system is further operable to analyze said sensor output to determine a first time at which the electrode dresser has been engaged by the welder by determining from said sensor output when the load of the dresser motor increases by a first threshold amount based on said sensor output.

6. The apparatus of claim 5 wherein said data acquisition system is further operable to analyze said sensor output to determine the amount of time in which the welder engages the electrode dresser by determining a time differential between the first time and a second time at which peak motor load decreases by a second threshold amount.

7. The apparatus of claim 6 wherein each of said first and second threshold amounts are 50 percent.

8. The apparatus of claim 1, further including a peak hold circuit in electrical communication with said sensor and said data acquisition system, for receiving the sensor output and holding a peak amplitude of the sensor output.

9. The apparatus of claim 8 wherein said data acquisition system is further operable to analyze said sensor output to determine whether the electrode dresser has been engaged by the welder electrodes by determining whether the peak amplitude of the sensor output has changed by a threshold amount.

10. The apparatus of claim 8, further including a reset circuit in electrical communication with said peak hold circuit and said data acquisition system, for resetting the peak hold circuit after a peak value has been read from the peak hold circuit by the data acquisition system.

11. The apparatus of claim 1, further including a vibration transducer in electrical communication with said data acquisition system, said vibration transducer sensing vibration generated by the electrode dresser and producing vibration signals corresponding to the sensed vibration.

12. The apparatus of claim 11 wherein said data acquisition system is further operable to receive said vibration signals and transform said vibration signals to the frequency domain, producing a dresser vibration spectrum which is analyzed by the data acquisition system to determine whether an anomalous operating condition is present.

13. The system of claim 12 wherein said data acquisition system is further operable to determine the presence of anomalous operating conditions by comparing peak amplitudes of a normal vibration spectrum to corresponding peak amplitudes of the dresser vibration spectrum and determining the existence of an anomalous operating condition when one or more peak amplitudes differ by a threshold amount.

14. A system for monitoring the operating condition of a plurality of electrode dressers for a plurality of welders with electrodes, each electrode dresser having a motor, the system comprising:

a plurality of sensors, each of said plurality of sensors sensing an operating characteristic of a welder electrode dresser and producing a sensor output corresponding to the operating characteristic that is sensed;

a plurality of peak hold circuits, each of said peak hold circuits being in electrical communication with a sensor for receiving a sensor output and holding a peak amplitude of the sensor output;

a plurality of vibration transducers, each of said plurality of vibration transducers being in electrical communication with an electrode dresser and sensing vibration generated by the electrode dresser to produce vibration signals corresponding to the vibration sensed;

a plurality of reset circuits, each of said reset circuits being in electrical communication with a peak hold circuit for resetting the peak hold circuits;

a multiplexer in electrical communication with said plurality of peak hold circuits, said plurality of vibration transducers, and said plurality of reset circuits; and a data acquisition system in electrical communication with said multiplexer for receiving peak amplitudes and vibration signals from the multiplexor and providing a reset signal to the multiplexor to reset a peak hold circuit after a peak amplitude is read, said data acquisition system analyzing the peak amplitudes and vibration signals to determine the operating conditions of the plurality of welders.

15. The system of claim 14 wherein said data acquisition system is further operable to analyze sensor outputs and vibration signals to determine whether electrode dressers have been engaged by the welders.

16. The system of claim 14 wherein said data acquisition system is further operable to analyze sensor outputs and vibration signals to determine the amount of time in which a welder engages an electrode dresser.

17. The system of claim 14 wherein said data acquisition system is further operable to transform said vibration signals to the frequency domain to produce dresser vibration spectra which are analyzed by the data acquisition system to determine whether anomalous dresser operating conditions are present.

18. The system of claim 17 wherein said data acquisition system is further operable to determine the presence of anomalous dresser operating conditions by comparing peak amplitudes of normal vibration spectra to corresponding peak amplitudes of dresser vibration spectra and determining when one or more peak amplitudes differ by a threshold amount.

19. A method for monitoring the operating condition of an electrode dresser for a welder with electrodes, the electrode dresser having a motor, the method comprising the steps of:

sensing an operating characteristic of a welder electrode dresser to produce a sensor output corresponding to the operating characteristic that is sensed; and analyzing said sensor output to determine the operating condition of the electrode dresser.

20. The method of claim 19 wherein the operating condition determined in accordance with the analyzing step is the amount of time in which the welder engages the electrode dresser.

21. The method of claim 19 wherein the operating condition determined in accordance with the analyzing step is whether the electrode dresser has been engaged by the welder.

22. The method of claim 19 wherein said analyzing step further includes the steps of:

determining from said sensor output when the load of the dresser motor increases by a first threshold amount at a first time;

determining from said sensor output when the load of the dresser motor decreases by a second threshold amount at a second time; and calculating a time differential between the first and second times corresponding to the amount of time in which the welder engages the dresser.

23. The method of claim 19 wherein said analyzing step further includes the steps of:

transforming said sensor output to the frequency domain to produce a sensor spectrum;

providing a normal spectrum corresponding to a sensor spectrum that is produced when no anomalous dresser operating conditions are present;

comparing peak amplitudes of the normal spectrum with peak amplitudes of the sensor spectrum; and determining the existence of an anomalous dresser operating condition when one or more peak amplitudes of the sensor spectrum differ from one or more peak amplitudes of the normal spectrum by a threshold amount.

\* \* \* \* \*